(12) United States Patent
Ganapathiappan

(10) Patent No.: US 6,858,301 B2
(45) Date of Patent: Feb. 22, 2005

(54) SPECIFIC CORE-SHELL POLYMER ADDITIVE FOR INK-JET INKS TO IMPROVE DURABILITY

(75) Inventor: Sivapackia Ganapathiappan, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 81 days.

(21) Appl. No.: 10/336,337

(22) Filed: Jan. 2, 2003

(65) Prior Publication Data
US 2004/0131855 A1 Jul. 8, 2004

(51) Int. Cl.[7] ............................... B32B 5/16
(52) U.S. Cl. ............... 428/407; 525/330.3; 525/333.3; 525/331.9; 525/902; 430/138
(58) Field of Search ................. 428/403, 407; 525/330.3, 333.3, 331.9, 902; 430/138

(56) References Cited

U.S. PATENT DOCUMENTS

| | | | |
|---|---|---|---|
| 5,215,851 A | 6/1993 | Tomita et al. | |
| 5,786,420 A | 7/1998 | Grandhee | |
| 5,872,189 A | * 2/1999 | Bett et al. ................. | 525/243 |
| 5,912,280 A | 6/1999 | Anton et al. | |
| 5,990,202 A | 11/1999 | Nguyen et al. | |
| 6,057,384 A | 5/2000 | Nguyen et al. | |
| 6,194,514 B1 | 2/2001 | Schenermann et al. | |
| 6,203,973 B1 | 3/2001 | Chen et al. | |
| 6,214,500 B1 | 4/2001 | Kumacheva et al. | |
| 6,224,981 B1 | * 5/2001 | Richard et al. ............. | 428/407 |
| 6,225,372 B1 | 5/2001 | Lykke et al. | |
| 6,248,805 B1 | 6/2001 | Nguyen et al. | |
| 6,252,004 B1 | 6/2001 | Blankenship et al. | |
| 6,270,748 B1 | 8/2001 | Annan et al. | |
| 6,337,131 B1 | 1/2002 | Rupaner et al. | |
| 6,359,031 B1 | 3/2002 | Lykke et al. | |
| 6,359,032 B1 | 3/2002 | Kuwahara et al. | |
| 6,383,500 B1 | * 5/2002 | Wooley et al. .............. | 424/401 |

FOREIGN PATENT DOCUMENTS

| | | |
|---|---|---|
| EP | 1318025 | 6/2003 |
| JP | 10123710 | 10/1996 |

OTHER PUBLICATIONS

Ishizu, Koji, "Synthesis and Structural Ordering of Core-Shell Polymer Microspheres", Progress in Polymer Science, vol. 23, 1998, pp. 1383–1408.

* cited by examiner

Primary Examiner—H. Thi Le

(57) ABSTRACT

Polymer particles are provided having (1) a core with a glass transition temperature within a range of −50° to +110° C. and (2) a shell surrounding the core. The core comprises at least one layer, with the layer(s) comprising at least one polymerized hydrophobic monomer and, optionally, a first cross-linker. The shell comprises a copolymerized mixture of least one hydrophobic monomer and at least one hydrophilic monomer and a second cross-linker for increasing thermal shear stability by forming cross-linkages. Use of these polymer particles in aqueous-based ink-jet inks provide laser print quality without any secondary treatment.

37 Claims, 1 Drawing Sheet

SPECIFIC CORE-SHELL POLYMER ADDITIVE FOR INK-JET INKS TO IMPROVE DURABILITY

TECHNICAL FIELD

The present invention relates generally to ink-jet printing ink compositions having superior smear fastness, as compared to prior art ink-jet ink printing compositions, and, more particularly, to the use of core-shell polymers with hydrophobic and hydrophilic portions that contribute to such superior smear fastness.

BACKGROUND ART

Ink-jet ink prints have a lot of advantages over laser-jet prints because of easy to print with vibrant color prints that can be made low cost. The major problem with ink-jet printing is that its durability, e.g., water fastness, smear fastness and light fastness, is poor compared to laser prints. Water-soluble dyes or water-dispersible pigments are used in ink-jet inks for nozzle reliability and kogation reasons. In laser prints, no solvent or vehicle is used; only polymer-coated solid colorant particles are used to fuse with the media. Ink-jet inks use water-soluble or dispersible colorants. The property of the colorant remains the same, namely, water-soluble or dispersible even after printing. In addition to these problems, there are other disparities in performance properties. These properties include sharpness of the image, highlighter smear fastness and wet smudge fastness etc. Currently, no polymer additive is known that can be added to the ink to solve all the above issues. The present teachings herein address and overcome the above deficiencies and bring similar performance to ink-jet prints as laser prints using specific core-shell polymer additives.

Attempts have been made previously to make ink-jet ink prints having laser print type quality and durability. None of the prior art deficiencies have been solved simultaneously with a single ink. The present teachings herein address the achieving of laser type durability, sharpness of the print, water-fastness, wet smudge-fastness, smear fastness and the like by the addition of a polymer additive to ink-jet ink. Previous attempts have been made to solve these issues. But previous inks containing polymers are not very shear stable and there is difficulty in keeping the nozzles functional over a long period of time or for a large number of prints. Recently, another patent application has been filed with USPTO in the name of the present inventor (U.S. patent application Ser. No. 09/956,431, filed Aug. 20, 2001), which demonstrates the improvement of shear stability of polymers. This type of polymer improves shear stability but the resulting smear fastness is not like that of laser type prints. There is therefore room to improve inkjet inks with a different kind of polymer additive to achieve laser type quality.

The synthesis of core-shell polymers is well known in polymer chemistry. Core-shell polymer synthesis and structures are described by K. Ishizu in Progress in Polymer Science, Vol. 23, pp. 1383–1408 (1998). The latex polymers that can be used in ink-jet pens are very few. A number of parameters have to be met by the latex polymer to be used in the ink. Among the most important parameters are that the polymers have to be compatible with the colorants and the co-solvents used in the ink without unduly changing the viscoelastic properties of the ink. The particle size of the polymer particles should not change with time in the presence of those co-solvents. The latex polymers should not form films in the nozzles and should remain indefinitely stably suspended in the ink. At the same time, the polymer particle should form a protective film after landing in the media. The latex particles described herein coalesce irreversibly, leading to the formation of film when the water concentration is reduced. Water can be absorbed by the media or diffused or evaporated with time to reduce its concentration. Alternately, one can apply heat to remove water faster. The latex polymers have to be shear-stable and be ejectable as fine droplets down to a volume of 0.2 pl. After printing on the print media, the latex polymers have to form a film that will protect the colorant to improve durability properties such as water fastness, smear fastness, dry rub resistance, and should also provide gloss to the print. Many patents disclose latex polymers that possess one or another of the foregoing properties, but none of the polymers known in the prior art meet all of the foregoing requirements.

Core-shell polymers are described in several patents and in the technical literature. However, many of them use one or more acid monomers in the core stage.

The prior art fails to teach the synthesis of hydrophobic core polymers with hydrophobic and hydrophilic shell materials, with particles greater than 50 nm with a cross-linked shell polymer. Further, the prior art does not teach polymers having any film-forming property of both the core and the shell polymers with shear stability. Thus, there is a need for core-shell polymers having these properties for use in ink-jet inks.

DISCLOSURE OF INVENTION

In accordance with the embodiments disclosed herein, the film-forming properties of both core and shell polymers in a core-shell system are improved. Further, cross-linking of the shell polymers is provided, as well as optional cross-linking of the core materials to improve shear stability. The storage stability of these polymers is excellent. These polymers are present as dispersions and trap the colorants or other particles present in the ink after landing on the print media.

In particular, polymer particles are provided having (1) a core with a glass transition temperature within a range of −50° to +110° C. and (2) a shell surrounding the core. The core comprises at least one layer, with the layer(s) comprising at least one polymerized hydrophobic monomer and, optionally, a first cross-linker. The shell comprises a copolymerized mixture of at least one hydrophobic monomer and at least one hydrophilic monomer and a second cross-linker for increasing thermal shear stability.

BRIEF DESCRIPTION OF THE DRAWINGS

The sole FIGURE schematically illustrates an embodiment of the structure of a core-shell particle employed herein.

BEST MODES FOR CARRYING OUT THE INVENTION

Definitions

Figure 1:
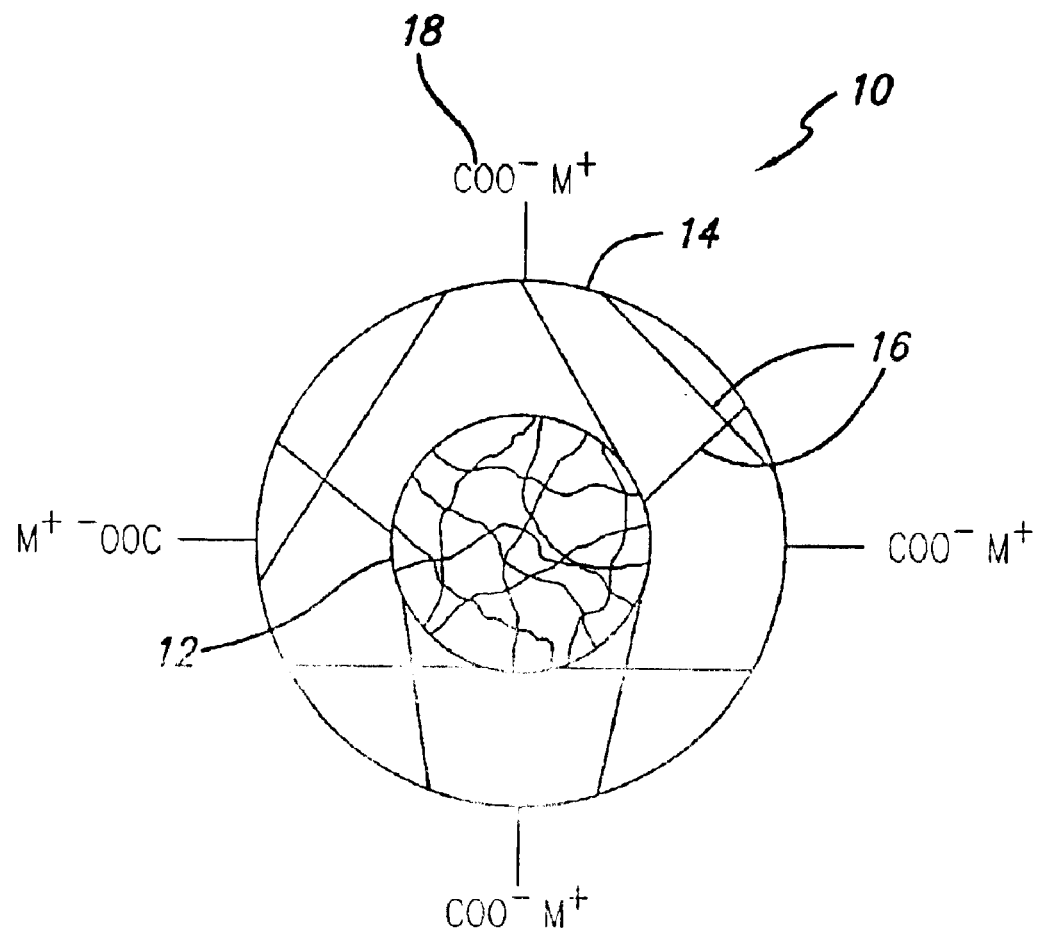

As defined herein, the term "water fastness" refers to the resistance of an impression to dilution or removal by water. A water fast ink has a reduced tendency to wick, feather or be washed away. Water fastness can be measured by wetting the printing area with water and determining the optical density (OD) in the neighboring areas (defined as "background OD") before and after the exposure to water.

As defined herein, the term "smear fastness" refers to the resistance of an image to smear on contact with a hard object, such as the tip of a highlighter, under normal pressure. A smear is defined as the transfer of colorant from the printing area to the neighboring areas (background) by the object. Smear fastness can be measured by determining the change of the background OD after subjecting the printing area to a standard smearing force.

As defined herein, the term "light fastness" refers to the durability of a print when exposed to light. When ink is light fast, it has fade resistance. It is generally thought that pigments have improved fade resistance over dyes but some of the newer dyes have shown that they can be comparable.

As defined herein, the term "shear stability" refers to the polymer particles' ability to maintain their original size under mechanical stress. Shear stability can be measured by subjecting the particles to mechanical stress and determining the change in particle size.

As defined herein, the term "convertible monomer" refers to monomers with long side chain acid groups. The convertible monomers are water insoluble in the monomer form. After polymerization, the acid group on the side chain of the convertible monomers can be converted to anionic salt by adjusting the pH of the solution to a basic range (pH>7), i.e., the hydrophobic monomer is incorporated into the polymer as a hydrophobic moiety, but is converted to a hydrophilic moiety under basic pH.

As used herein, the term "seed polymer" and "core polymer" mean the same thing, namely, the polymer particles formed in the beginning. The shell is grown on top of the initial polymer (seed or core). More than one core layer can be prepared by repeating the same process again and again with the same or different monomer combinations. In the present case, only two layers are described. More layers, up to five, are possible by the methods disclosed herein to improve the properties of the ink and print.

Preparation of Stable and Durable Polymers by Seeded Polymerization

In the embodiments disclosed herein, stable polymer particles are prepared by the seeded polymerization method so that the surface group can be incorporated with smaller quantities of hydrophilic or charged groups just sufficient to maintain the stability.

Seeded polymerization means the same monomer emulsion is used to form the polymer particles in a sequence of steps. In the first step, smaller particles are formed in larger numbers or other smaller latex particles (<100 nm or preferably <50 nm) are added in small quantities. Then the remaining feed is started so that the new emulsion surrounds the seed preferentially; thus, the particle size grows on the smaller particle.

In the core-shell structure, the core is formed and then other monomers are added to form the shell. This is slightly different from the seeded type, but both are disclosed and claimed herein. Previously, cross-linking was not used. However, cross-linking, especially in the shell structure, is required here to improve the shear stability. The prior art polymers are not shear stable. Shear stability is unique to the present system.

In particular, polymer particles are provided having (1) a core with a glass transition temperature within a range of −50° to +110° C. and (2) a shell surrounding the core. The core comprises at least one layer, with the layer(s) comprising at least one polymerized hydrophobic monomer and, optionally, a first cross-linker. The shell comprises a copolymerized mixture of at least one hydrophobic monomer and at least one hydrophilic monomer and a second cross-linker for increasing thermal shear stability.

Specifically, first the core is formed using hydrophobic monomers, such as methyl methacrylate and hexyl acrylate in the ratio of 50:50. The typical range of the ratio is 10:90 to 90:10. Alternatively, these monomers can be changed to other hydrophobic monomers such as butyl methacrylate, 2-ethylhexylmethacrylate, hexyl methacrylate, and styrene. This core gives the most durability to the prints.

The core can comprise one layer or more than one layer. Preferably, the core comprises from 1 to 4 layers, each layer comprising at least one polymerized hydrophobic monomer and, optionally, the cross-linker. The polymerized hydrophobic monomer and the cross-linker, if present, may be the same or different in each layer.

As mentioned above, each layer is formed by seeded polymerization of the hydrophobic monomer(s). The seeded polymerization uses a surfactant to emulsify the monomer(s). The surfactant is selected from the group consisting of non-ionic, cationic, anionic, and amphoteric surfactants. Preferably, the non-ionic surfactants are selected from the group consisting of the TRITONs (alkyl phenyl polyethylene oxides available from Rohm & Haas Co.), the TWEENs (derivatives of polyethylene oxides available from ICI Surfactants), and SOLSPERSEs (aromatic ethoxylates available from Zeneca); the cationic surfactants are selected from the group consisting of (alkyl/aryl or substituted alkyl/aryl) ammonium salts; the anionic surfactants are selected from the group consisting of phosphates, sulfonates, sulfates and carboxylates; and the amphoteric surfactants are selected from the group consisting of surfactants having any of the foregoing cationic functional groups and any of the foregoing anionic functional groups.

At least one of the layers in the core may include a cross-linker, which may be the same or different for each layer. If present, the cross-linker has: a concentration within a range of about 0.1 to 10 wt %, based on the polymerized hydrophobic monomer content for that layer. Preferably the concentration is within a range of about 1 to 2 wt %.

If present, the cross-linker includes di-functional or poly-functional polymerizable groups. Preferably, the cross-linker is selected from the group consisting of ethylene glycol dimethacrylate, 1,4-butanediol dimethacrylate, triethylene glycol dimethacrylate, tetraethyleneglycol dimethacrylate, 1,6-hexanediol dimethacrylate, neopentyl glycol dimethacrylate, polyethylene glycol (PEG) dimethacrylate wherein tho polyethylene glycol has a molecular weight from 400 to 6000, tetraethylene glycol dimethacrylate, ethoxylated Bisphenol A dimethacrylate with up to 50 ethoxy units, cyclohexane dimethanol dimethacrylate, tripropylene glycol dimethacrylate, trimethylolpropane trimethacrylate, pentaerythritol trimethacrylate, pentaerythritol tetramethacrylate, dipentaerythritol pentamethacrylate, alkoxylated glyceryl with up to 30 carbon atoms, trimethylopropane trimethacrylate, tris (2-hydroxyethyl) isocyanurate trimethacrylate, 3-(acryloyloxy)-2-hydroxypropyl methacrylate, mono-2-(methacryloyloxyethyl) maleate and divinyl benzene, wherein any methacrylate group can be replaced with an acrylate group or an acrylamide group or a methacrylamide group.

The hydrophobic polymerized monomer(s) employed in the core is(are) selected from the group consisting of (1) acrylate and methacrylate esters of alcohols and substituted alcohols with a carbon length of 1 to 50 carbon atoms, (2)

styrene and its derivatives, and (3) butadiene and its derivatives. By "derivatives" herein is meant the use of substituted groups, such as alkyl, aryl, halo, esters, ethers, aldehydes, and ketones. Preferably, the hydrophobic polymerized monomer(s) is(are) selected from the group consisting of methyl acrylate, methyl methacrylate, ethyl acrylate, ethyl methacrylate, butyl acrylate, butyl methacrylate, hexyl acrylate, hexyl methacrylate, 2-ethylhexyl methacrylate, 2-ethylhexyl acrylate, octyl acrylate, octyl methacrylate, lauryl methacrylate, styrene, 4-methylstyrene, 4-chloromethylstyrene, butadiene, vinyl chloride, substituted olefins, vinylpyridines, vinyl acetates, vinyl butyrate, acrylonitrile, methacrylonitrile, maleimide derivatives, vinyl ethers $CH_2=CH-OR$ (R=alkyl or substituted alkyl groups), allyl monomers selected from the group consisting of allyl ether, allyl carbonates, and allyl dicarbonates, and vinyl ketones.

Preferably, at least one of the layers in the core comprises at least two hydrophobic polymerized monomers.

The core is formed, as mentioned above, using seeded polymerization. That is to say, a seed (polymer) is provided and then is built up with the same or other hydrophobic monomers thereon, in one or more layers.

If desired, there can be a small amount of at least one hydrophilic monomer in the cores to keep them suspended during the preparation. In this context, by "small amount" is meant less than 20 wt %, and preferably less than 8 wt %, and most preferably about 0.1 to 5 wt %, based on the total core content.

Next, a shell polymer that encapsulates the core is prepared by polymerizing, e.g., methyl methacrylate, hexyl acrylate, ethyleneglycol dimethacrylate, and methacryloyloxyethyl succinate in the ratio of 7.8:7.8:4:0.4. The weight ratio of core to shell is varied from 5:95 to 95:5 wt %. The preparation of the shell polymer is outlined as the side chain conversion method in above-referenced U.S. patent application Ser. No. 09/956,431.

The cross-linker, which is required in the shell, may be the same or different as the cross-linker optionally used in the core. The concentration of the cross-linker in the shell is within a range of about 0.1 to 10 wt %, based on the total polymer content. Preferably, the concentration is within a range of about 1 to 2 wt %. The cross-linker is independently selected from the same group of cross-linkers as listed above.

The presence of the cross-linker in the shell is significant. The cross-linker increases thermal shear stability; this apparently is unknown in the prior art. By "thermal shear stability" is meant that the particle size does not change over time.

The shell is formed by free radical polymerization of at least one hydrophilic monomer, at least one hydrophobic monomer, and at least one cross-linker. The hydrophilic monomer is selected from the group consisting of acid-containing monomers such as acrylic acid, methacrylic acid, mono-methacryloyloxyethyl succinate, mono-acryloyloxyethyl succinate, mono-methacryloyloxyethyl phthalate, mono-methacryloyloxyethylmaleate, methacryloyloxyethylphosphate, acrylamidobutyric acid, 3-vinylbenzoic acid, 4-vinylbenzoic acid, 4-vinylphenylacetic acid, vinyl phosphate, styrene sulfonate, vinyl acetic acid, acryloyloxypropionic acid, 2-vinylpyrrolidone, 2-sulfatoethyl methacrylate, 1-vinylimidazole, itaconic acid, maleic acid, maleic arhydride, acrylamide, acrylamido propane sulfonic acid derivatives and poly(ethylene glycol) methacrylates of low molecular weight (<2000). Some monomers, for example, hydroxyethyl methacrylate and hydroxyethyl acrylate, are soluble in water but after polymerization they become water insoluble and act as stabilizing groups. Mixtures of any of the foregoing monomers can also be used to increase the stability and to improve printability and print properties. The hydrophobic monomer is selected from the group of hydrophobic monomers listed earlier.

The core, including all layers, has a thickness within a range of about 10 to 350 nm, preferably about 100 to 240 nm, and most preferably about 150 to 200 nm. The shell has a thickness within a range of about 2 to 400 nm, preferably about 10 to 200 nm, and most preferably about 20 to 100 nm. The polymer particles (core plus shell) have a total thickness within a range of about 50 to 500 nm, preferably, about 100 to 400 nm, and most preferably, about 150 to 300 nm.

The core comprises about 5 to 95 wt % of the total polymer particle, the shell comprising the balance (95 to 5 wt %).

There can be an abrupt compositional change from the polymer in the core to the polymer in the shell. Alternatively, there can be a compositional gradient in changing from the polymer in the core to the polymer in the shell. This region is called the interphase between the core and shell; a gradient (continuous change to the shell components from the core phase materials) may be achieved by adjusting the feed of monomer mixture during the polymerization.

The structure of the polymer particle 10 is shown in FIG. 1. The polymer particle 10 comprises the core 12, surrounded by the shell 14. Cross-linking in the shell 14 for shear stability is indicated at 16. The surface of the polymer particle 10 is provided with a plurality of anionic groups 18, shown here as carboxylate $COO^-M^+$, to adjust the zeta potential and to contribute to shear stability. Useful anions also include sulfate, sulfonate, and phosphate.

When water is removed, such as by evaporation, an irreversible process takes place to coalesce the particles, which finally form a clear film. This film protects the colorant by encapsulating it during the coalescence process. During this process, the core polymer or the seed is exposed once the outer layer containing the network, i.e., shell, is collapsed. This improves the durability of the prints significantly.

Neutralizing agents for acid groups include ammonia, alkali metal hydroxides, carbonates and bicarbonates, such as lithium hydroxide, sodium hydroxide, potassium hydroxide, potassium carbonate, potassium bicarbonate etc. Other neutralizing agents like organic amines such as ethanolamine, dimethylaminoethanol, and triethylamine can also be used. These neutralizing agents are used to adjust pH and to improve ionization of anionic groups, as well as to determine the cationic groups.

The molecular weight (weight average) of the polymers (core and shell) range from 10,000 to 10,000,000, preferably from 20,000 to 1,000,000, and most preferably from 30,000 to 200,000.

The shell supports the stability of core; otherwise, the core is not shear stable. The hydrophobic monomer of the shell polymer may or may not be the same as the hydrophobic monomer(s) of the core. The core and shell components are prepared with or without being isolated from the reactor. The rates of addition of monomer emulsion or the initiator during the emulsion polymerization are adjusted to obtain the desired particle size of the latex polymer and to have desired properties of the ink.

Hydrophilic monomers, as used herein, refer to monomers that are soluble in water either by themselves or that produce polymers that have increased water solubility after neutralization with some bases The polymers disclosed herein are prepared by emulsion or interfacial polymerization. Under these types of polymerization, the process can be carried out from 300 to 100° C., using batch, semi-batch, and continuous or semi-continuous emulsion process for the emulsion polymerization, for example. The polymerization can be initiated using free-radical initiators or redox initiators. Examples of suitable initiators include, but are not limited to, potassium persulfate, sodium persulfate, ammonium persulfate, hydrogen peroxide, 2,2'-azobis(2-methyl propinamideine)dihydrochloride, 4,4'-azobis(4-cyanovaleric acid) and salts thereof, and 1,1'-azobis(N,N'-dimethylformamide). The concentration of the (solid) initiators is from 0.05 to 10 wt % in the monomer, and the rate of addition of initiators can be either bulk or by a rate of 0.01 to 25 ml per min, depending on the concentration of the initiators dissolved in water, where the typical concentration of the initiator in water is in the range of 0.1 to 50 wt %. The addition can be either stepwise or gradual. The polymerization process can be carried out with or without chain transfer agents known in the art.

Inks for ink-jet printing are prepared by combining the polymers of the invention with colorant (dyes or pigments) either in self-dispersed form or dispersed using the polymeric materials disclosed herein and with co-solvents well-known in the ink-jet formulation art. Examples of such co-solvents and colorants, as well as their concentrations, are disclosed, e.g., in U.S. Pat. No. 6,036,759, entitled "Black to Color Bleed Control in Ink-Jet Printing Inks", issued on Mar. 14, 2000, to P. Wickramanayake et al and assigned to the same assignee as the present application. The contents of that patent are incorporated herein by reference.

The concentration range of the polymer particles in the inks is in the range of 0.1 to 10 wt %, preferably from 1 to 5 wt %, and most preferably from 2 to 4 wt %.

These inks can be used in thermal, piezoelectric, or continuous ink-jet ink printer cartridges. The pH of the ink is from 2 to 11, preferably from 5 to 9, and most preferably from 7 to 9.

EXAMPLES

Preparation of the Stable and Durable Polymer

Example 1

Methyl methacrylate (17.07 g) and hexyl acrylate (17.07 g) were mixed along with isooctylthioglycolate (0.17 g) in water (11.4 ml). This was emulsified with 30% Rhodafac RS 710 in water (1.63 g). This emulsion was added to water (125 ml) at 90° C. containing potassium persulfate (0.2 g) in a reactor. It was maintained in the reactor at 90° C. for 30 min. At this stage, the particle of this seed or core was found to be 180 nm. Then more potassium persulfate (0.1 g) was added. Immediately, another emulsion was prepared with methyl methacrylate (3.33 g), hexyl acrysate (3.33 g), ethylene glycol dimethacrylate (0.17g), methacryloyloxyethyl succinate (1.7 g) and isooctylthioglycolate (0.05 g) in water (2.85 g) containing 30% Rhodafac RS 710 in water (0.5 g) and was added to the reactor. It was maintained at 90° C. for another 1 hr and cooled to ambient temperature. Then it was brought to pH 8.5 by adding sufficient amounts of potassium hydroxide. The particle size was found to be 210 nm.

The above polymer was tested for its shear stability by diluting to 4% and stirring in a high speed blender for 5 minutes at 60° C. Afterwards the particle was measured and found not to change. This polymer was formulated by a standard procedure with Cabot pigments (Cabojet 300) to obtain inks. Typically, a colorant dispersed in water is mixed with humectants, surfactants and organic solvents such as 2-pyrrolidone and alkylenediols and the like with a small quantity of biocide along with the polymer prepared in the present invention. The final concentration of pigment was 3%, polymer was 3%, solvent vehicle was 20%, surfactant was 1% and the biocide was 0.3%. In order to perform a print test, the ink was filled into the black ink cartridge of a HP Deskjet printer prototype product. The resultant prints had a water fastness of 0 mOD and a smear fastness with yellow highlighter pens with three passes of 0 mOD. This indicates that the colorant is not transferred to other unprinted areas, similar to laser printer performance. This is the first example of achieving durability with inkjet inks similar to laser prints. Other colored pigment particles self-suspended in water can also be used to replace Cabojet 300.

The same procedure was adopted to make a variety of polymers, which are shown in the following Table. The concentration of the monomers is listed in weight percent.

TABLE I

| Example Polymer | Feed | MMA | HA | HMA | MES | EGDMA | Shear Stability | Durability |
|---|---|---|---|---|---|---|---|---|
| 1 | | | | | | | Good | Excellent |
| | core | 40 | 40 | | | | | |
| | shell | 7.8 | 7.8 | | 4 | 0.4 | | |
| 2 | | | | | | | Excellent | Excellent |
| | core | 17.5 | 17.5 | | | | | |
| | shell | 29.2 | 29.2 | | 6 | 0.6 | | |
| 3 | | | | | | | Excellent | Excellent |
| | core | 40 | 40 | | | | | |
| | shell | 6.7 | 6.7 | | 6 | 0.6 | | |
| 4 | | | | | | | Poor | Excellent |
| | core | 45 | 45 | | | | | |
| | shell | 3.35 | 3.35 | | 3 | 0.3 | | |
| 5 | | | | | | | Good | Good |
| | core | 37.5 | 22.5 | | | | | |
| | shell | | | 33.4 | 6 | 0.6 | | |

TABLE I-continued

Examples of Polymers.

| Example Polymer | Feed | MMA | HA | HMA | MES | EGDMA | Shear Stability | Durability |
|---|---|---|---|---|---|---|---|---|
| 6 | | | | | | | Excellent | Good |
| | core | 25 | 15 | | | | | |
| | shell | | | 50.1 | 9 | 0.9 | | |
| 7 | | | | | | | Excellent | Good |
| | core | 43.5 | 23.25 | | 7.5 | 0.75 | | |
| | shell | | | 22.5 | 2.5 | 0.25 | | |
| 8 | | 50 | 50 | | | | Very poor | Excellent |

Notes:
MMA — methyl methacrylate
HA — hexyl acrylate
HMA — hexyl methacrylate
MES — mono-methacryloyloxyethyl succinate
EGDMA — ethylene glycol dimethacrylate.

As shown in the above Table I, at least 6% of MES with 0.6% of EGDMA is necessary to maintain the shear stability. If the concentration of the ingredients goes below that level, then the shear stability is poor and consequently not good for storage (see Example 4). An ordinary polymer (Example 8) is also shown here for comparison. The shear stability is very poor without acid functional groups and cross-linking units. In Examples 5 to 7, the incorporation of small quantity of acid groups in the seed or core stage may be beneficial for large scale production and they have excellent shear stability with reasonable print properties. In these examples, even though the shell monomer is changed to HMA, the formation of core-shell is achieved with shear stability.

INDUSTRIAL APPLICABILITY

The present polymer particles, based on seeded polymerization of the core and including cross-linking in the shell, are expected to find use in ink-jet inks.

What is claimed is:

1. Polymer particles having (1) a core with a glass transition temperature within a range of −50° to +110° C., said core comprising at least one layer, said at least one layer comprising at least one polymerized hydrophobic monomer and, optionally, a first cross-linker, and (2) a shell surrounding said core, said shell comprising a copolymerized mixture of at least one hydrophobic monomer and at least one hydrophilic monomer and a second cross-linker for increasing thermal shear stability.

2. The polymer particles of claim 1 wherein said core comprises from 1 to 4 layers, each said layer comprising at least one said polymerized hydrophobic monomer and, optionally, said cross-linker, said at least one polymerized hydrophobic monomer and said cross-linker, if present, being the same or different in each said layer.

3. The polymer particles of claim 2 wherein each said layer is formed by seeded polymerization of said at least one hydrophobic monomer, using a surfactant to emulsify said at least one monomer.

4. The polymer particles of claim 3 wherein said surfactant is selected from the group consisting of non-ionic, cationic, anionic, and amphoteric surfactants.

5. The polymer particles of claim 4 wherein said non-ionic surfactants are selected from the group consisting of derivatives of polyethylene oxides, alkyl phenyl polyethylene oxides, and aromatic ethoxylates, wherein said cationic surfactants are selected from the group consisting of (alkyllaryl or substituted alkyl/aryl) ammonium salts, wherein said anionic surfactants are selected from the group consisting of phosphates, sulfonates, sulfates and carboxylates, and wherein said amphoteric surfactants are selected from the group consisting of surfactants having said cationic functional groups and said anionic functional groups.

6. The polymer particles of claim 2 wherein at least one of said layers includes said first cross-linker, which may be the same or different for each said layer.

7. The polymer particles of claim 6 wherein said first cross-linker has a concentration within a range of about 0.1 to 10 wt %, based on said polymerized hydrophobic monomer content for that layer.

8. The polymer particles of claim 7 wherein said concentration is within a range of about 1 to 2 wt %.

9. The polymer particles of claim 6 wherein said first cross-linker includes di-functional or polyfunctional polymerizable groups.

10. The polymer particles of claim 9 wherein said first cross-linker is selected from the group consisting of ethylene glycol dimethacrylate, 1,4-butanediol dimethacrylate, triethylene glycol dimethacrylate, tetraethyleneglycol dimethacrylate, 1,6-hexanediol dimethacrylate, neopentyl glycol dimethacrylate, polyethylene glycol dimethacrylate wherein the polyethylene glycol has a molecular weight from 400 to 6000, tetraethylene glycol dimethacrylate, ethoxylated Bisphenol A dimethacrylate with up to 50 ethoxy units, cyclohexane dimethanol dimethacrylate, tripropylene glycol dimethacrylate, trimethylolpropane trimethacrylate, pentaerythritol trimethacrylate, pentaerythritol tetramethacrylate, dipentaerythritol pentamethacrylate, alkoxylated glyceryl with up to 30 carbon atoms, trimethylopropane trimethacrylate, tris(2-hydroxyethyl) isocyanurate trimethacrylate, 3-(acryloyloxy)-2-hydroxypropyl methacrylate, mono-2-(methacryloyloxyethyl) maleate and divinyl benzene, wherein any methacrylate group can be replaced with an acrylate group or an acrylamide group or a methacrylamide group.

11. The polymer particles of claim 1 wherein said core further comprises at least one hydrophilic monomer in an amount less than 20 wt %.

12. The polymer particles of claim 11 wherein said at least one hydrophilic monomer is in an amount less than 8 wt %.

13. The polymer particles of claim 12 wherein said at least one hydrophilic monomer is in an amount from 0.1 to 5 wt %.

14. The polymer particles of claim 1 wherein said at least one hydrophobic polymerized monomer is selected from the group consisting of (1) acrylate and methacrylate esters of alcohols and substituted alcohols with a carbon length of 1 to 50 carbon atoms, (2) styrene and its derivatives, and (3) butadiene and its derivatives.

15. The polymer particles of claim 14 wherein said at least one hydrophobic polymerized monomer is selected from the group consisting of methyl acrylate, methyl methacrylate, ethyl acrylate, ethyl methacrylate, butyl acrylate, butyl methacrylate, hexyl acrylate, hexyl methacrylate, 2-ethylhexyl methacrylate, 2-ethylhexyl acrylate, octyl acrylate, octyl methacrylate, lauryl methacrylate, styrene, 4-methylstyrene, 4-chloromethylstyrene, butadiene, vinyl chloride, substituted olefins, vinylpyridines, vinyl acetates, vinyl butyrate, acrylonitrile, methacrylonitrile, maleimide derivatives, vinyl ethers given by $CH_2=CH-OR$ (where R=alkyl or substituted alkyl groups), allyl monomers selected from the group consisting of allyl ether, allyl carbonates, allyl dicarbonates, and vinyl ketones.

16. The polymer particles of claim 1 wherein said at least one layer comprises at least two said hydrophobic polymerized monomers.

17. The polymer particles of claim 1 wherein said at least one hydrophobic polymerized monomer in said core is the same or different as said at least one hydrophobic polymerized monomer in said shell.

18. The polymer particles of claim 1 wherein said at least one hydrophilic monomer is each selected from the group consisting of acid-containing monomers selected from the group consisting of acrylic acid, methacrylic acid, mono-methacryloyloxyethyl succinate, mono-acryloyloxyethyl succinate, mono meth-acryloyloxyethyl phthalate, mono-methacryloyloxyethyl-maleate, methacryloyloxyethylphosphate and acrylamidobutyric acid, 3-vinylbenzoic acid, 4-vinyl-benzoic acid, and 4-vinylphenylacetic acid, vinyl phosphate, styrene sulfonate, vinyl acetic acid, acryloyioxypropionfc acid, hydroxyethyl methacrylate, hydroxyethyl acrylate, 2-vinylpyrrolidone, 2-sulflatoethyl methacrylate, 1-vinyl-imidazole, itaconic acid, maleic acid, maleic anhydride, acrylamide, acrylamido propane sulfonic acid derivatives, and poly(elhylene glycol) methacrylates of low molecular weight less than 2000 and mixtures thereof.

19. The polymer particles of claim 18 wherein said at least one hydrophobic monomer and said at least one hydrophilic monomer are copolymerized by free radical polymerization.

20. The polymer particles of claim 1 wherein said second cross-linker is the same or different as said first cross-linker.

21. The polymer particles of claim 1 wherein said second cross-linker has a concentration within a range of about 0.1 to 10 wt %, based on said copolymerized hydrophilic monomer content.

22. The polymer particles of claim 21 wherein said concentration is within a range of about 1 to 2 wt %.

23. The polymer particles of claim 21 wherein said second cross-linker includes di-functional or polyfunctional polymerizable groups.

24. The polymer particles of claim 23 wherein said second cross-linker is selected from the group consisting of ethylene glycol dimethacrylate, 1,4-butanediol dimethacrylate, triethylene glycol dimethacrylate, tetraethyleneglycol dimethacrylate, 1,6-hexanediol dimethacrylate, neopentyl glycol dimethacrylate, polyethylene glycol dimethacrylate wherein the polyethylene glycol has a molecular weight from 400 to 6000, tetraethylene glycol dimethacrylate, ethoxylated Bisphenol A dimethacrylate with up to 50 ethoxy units, cyclohexane dimethanol dimethacrylate, tripropylene glycol dimethacrylate, trimethylolpropane trimethacrylate, pentaerythritol trimethacrylate, pentaerythritol tetramethacrylate, dipentaerythritol pentamethacrylate, alkoxylated glyceryl with up to 30 carbon atoms, trimethylopropane trimethacrylate, tris(2-hydroxyethyl) isocyanurate trimethacrylate, 3-(acryloyloxy)-2-hydroxypropyl methacrylate, mono-2-(meth-acryloyloxyethyl) maleate and divinyl benzene, wherein any methacrylate group can be replaced with an acrylate group or an acrylamide group or a methacrylamide group.

25. The polymer particles of claim 1 wherein said core has a thickness within a range of about 10 to 350 nm, said shell has a thickness within a range of about 2 to 400 nm, and said polymer particles have a total thickness within a range of about 50 to 500 nm.

26. The polymer particles of claim 25 wherein said core has a thickness within a range of about 100 to 240 nm, said shell has a thickness within a range of about 10 to 200 nm, and said polymer particles have a total thickness of about 100 to 400 nm.

27. The polymer particles of claim 26 wherein said core has a thickness within a range of about 150 to 200 nm, said shell has a thickness within a range of about 20 to 100 nm, and said polymer particles have a total thickness of about 150 to 300 nm.

28. The polymer particles of claim 1 wherein said core comprises about 5 to 95 wt % of said total polymer particle and said shell comprises the balance.

29. The polymer particles of claim 1 wherein there is an abrupt change in composition from said polymer in said core to said polymer in said shell.

30. The polymer particles of claim 1 wherein there is a gradient in composition in changing from said polymer in said core to said polymer in said shell.

31. The polymer particles of claim 1 wherein each polymerization includes at least one initiator, present in an amount of about 0.01 to 10 wt % of said at least one monomer.

32. The polymer particles of claim 31 wherein said amount is within a range of about 0.1 to 3 wt %.

33. The polymer particles of claim 32 wherein said range is about 0.3 to 1 wt %.

34. The polymer particles of claim 31 wherein said at least one initiator is selected from the group consisting of potassium persulfate, sodium persulfate, ammonium persulfate, hydrogen peroxide, 2,2'-azo-bis(2-methyl propinamideine) dihydrochloride, 4,4'-azobis(4-cyanovale-ric acid) and salts thereof, and 1,1'-azobis(N,N'-dimethylformamide).

35. An ink-jet ink comprising a vehicle and at least one colorant, said vehicle comprising at least one co-solvent and water, said colorant selected from the group consisting of dyes and pigments, said ink further comprising polymer particles having (1) a core with a glass transition temperature within a range of −50° to +110° C., said core comprising at least one layer, said at least one layer comprising at least one polymerized hydrophobic monomer and, optionally, a first cross-linker, and (2) a shell surrounding said core, said shell comprising a copolymerized mixture of at least one hydrophobic monomer and at least one hydrophilic monomer and a second cross-linker for increasing thermal shear stability, said polymer particles having a concentration in said ink within a range of 0.1 to 10 wt %, based on said inkjet ink.

36. The ink-jet ink of claim 35 further comprising at least one surfactant.

37. The ink-jet ink of claim 35 wherein said core further comprises at least one hydrophilic monomer in an amount less than 20 wt %.

* * * * *

UNITED STATES PATENT AND TRADEMARK OFFICE
CERTIFICATE OF CORRECTION

PATENT NO.    : 6,858,301 B2
DATED         : February 22, 2005
INVENTOR(S)   : Ganapathiappan It is certified that error appears in the above-identified patent and that said Letters Patent is hereby corrected as shown below:

Column 11,
Line 35, delete "acryloyiox-" and insert -- acryloylox- --.
Line 36, delete "ypropionfc" and insert -- ypropionic --.

Signed and Sealed this

Third Day of January, 2006

JON W. DUDAS
*Director of the United States Patent and Trademark Office*